UNITED STATES PATENT OFFICE.

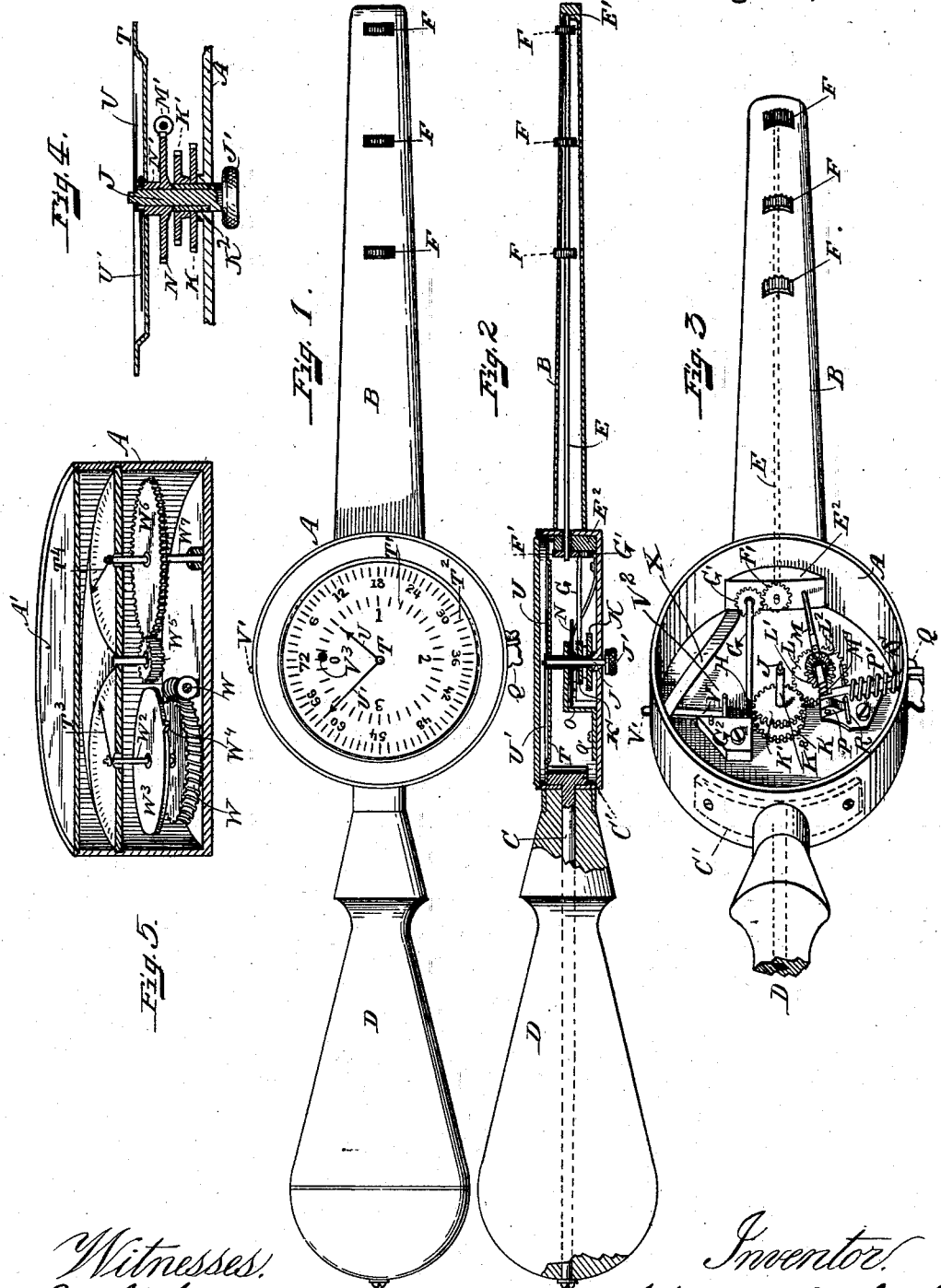

WILLIAM E. CLARKE, OF KANSAS CITY, MISSOURI.

CLOTH-MEASURING DEVICE.

SPECIFICATION forming part of Letters Patent No. 524,755, dated August 21, 1894.

Application filed June 23, 1893. Serial No. 478,589. (No model.)

*To all whom it may concern:*

Be it known that I, WILLIAM E. CLARKE, of Kansas City, county of Jackson, and State of Missouri, have invented certain new and useful Improvements in Devices for Measuring Cloth, of which the following is a full, clear, and exact description, which will enable others skilled in the art to which it appertains to use the same.

My invention consists of certain novel features, arrangements and combinations as hereinafter described and particularly pointed out in the claims.

In the accompanying drawings which illustrate my invention: Figure 1 is a plan view of my device. Fig. 2 is a view in longitudinal section with the handle in side elevation. Fig. 3 is a view in perspective with parts of the mechanism removed. Fig. 4 is a detailed view of certain mechanism hereinafter described. Fig. 5 is a modified form of my invention.

Like letters of reference refer to like parts throughout the several views.

From a case A projects a fixed, hollow extension B, and a rod C extends from the case diametrically opposite to the extension B, and around this rod C, which is secured to the case A by the flange C', is a handle D loose on the rod C and adapted to rotate on the same. Within the extension B is located a shaft E journaled at one end at E' and at the other end in a block E² fixed in the case A. On the shaft E needle-pointed disks F are fast secured and communicate their movement to the shaft E. The inner end of the shaft E extends through the block E² and has thereon a gear-wheel F' adapted to mesh with the gear-wheel G' on the shaft G, which is journaled at one end in the block E² and at the other end in the block G². The shaft G, near the end journaled in the block G², has a worm-gear H meshing with the wheel K', which, with the wheel K, located below it, is secured fast on the internal sleeve K², which is slipped over the shaft J so that any movement given to the wheel K' is communicated to the shaft J.

The wheel K meshes with the wheel L journaled in the bottom of the case A, and is provided on its upper surface with a beveled-gear L' meshing with the beveled-gear L² on the shaft M, one end of which is journaled in the block E², and the other end in the block P. At the end near the block P the shaft M has a worm-gear M' which meshes with the wheel N having a hub N' which fits round the shaft J and extends upwardly around said shaft. The end of the shaft M, journaled in the block P, passes through a rod P' in which a pin R is located, and against this pin a spring S exerts its pressure to force the worm gear M' in contact with the teeth of the wheel N so that the movement of the worm gear will be communicated to the said wheel N thereby moving said wheel one tooth, which represents one yard on the yard dial, in other words,—every complete revolution of the inch hand U moves the wheel N one tooth which represents one yard on the yard dial.

One end of the rod P' extends through the case A and has an opening in which is fitted a wedge Q, so that when it is desired to remove the worm gear M' from the teeth of the wheel N the wedge is pushed from its normal position, thereby moving the rod outwardly and the worm gear M' from the teeth of the wheel N, which allows the said wheel N to rotate by means of the shaft J.

An arm O is secured to the bottom of the case A by the screws O', and extends upwardly and is fitted around the hub N' of the wheel N so as to hold the wheels in their proper positions. The shaft J and hub N' extend upwardly through the dial T, and upon the hub N' the yard hand U' is fitted, and upon the shaft J the inch hand U is fitted. The inch hand travels in the circle represented by T' and the yard hand travels in the circle represented by T². If it should be desired to return both hands to zero before measuring the cloth the wedge Q is slipped from its normal position, as above described, so as to disengage the worm gear M' from the teeth of the wheel N; then the projection V' of the lever V which projects through the case is pressed down, and the vertical pin V² passes up through the opening V³ in the dial and presents a stop to the rotation of the hands, which are rotated by turning the knob J' until they come at rest against the pin V², the finger is then removed from the projection V' and the wedge is returned to its normal position by which the gearing is again thrown into operative connection. The spring X holds the pin V² below the opening V³.

The inner circle T' represents the inches which are designated by the hand U, which receives its movement from the shaft J rotated by the wheel K', receiving its movement from the needle pointed disks F through the shaft E, gear wheels F' G', shaft G and worm H. The mechanism is so arranged that a complete revolution of the inch hand U, representing thirty six inches of cloth, gives one movement to the hand U' mounted on the hub N' of the wheel N.

Fig. 5 represents a modified form of my apparatus. In this case the worm gear W meshes with the wheel W' mounted on the shaft W², on which is fast secured a disk W³ having a projection W⁴. When the hand T³, fixed on the shaft W², has made a complete revolution the projection W⁴ contacts with the pinion W⁵ and turns the same, thereby giving a movement of one tooth to the wheel W⁶ mounted fast on the shaft W⁷, at the upper end of which is the yard hand T⁴ traveling around the yard dial and which represents the number of inches transferred from the inch dial to the yard dial through the connections just described.

My device is operated as follows:—In taking stock the inner end of a roll of cloth is located and the extension B is slipped in at that point and the device is moved around the cloth until the outer end is reached, so that the number of inches and yards in the piece of cloth are accurately measured and indicated on the dial, without unrolling the goods to measure it as is now the practice.

Having thus ascertained the nature and set forth the construction of my invention, what I claim as new, and desire to secure by Letters Patent of the United States, is—

1. In a cloth measuring device, a casing having a revoluble handle at one side and a hollow extension on the opposite side provided with a series of openings in combination with a drive-shaft journaled in said casing and extension and having toothed disks projecting through the openings, a gear carried by the inner end of the drive-shaft, a shaft G carrying at one end a gear in mesh with the gear on the drive-shaft and at the opposite end a worm H, a vertical pintle J carrying a sleeve, gears K K' carried by the sleeve, said gear K' being in mesh with worm H, a second shaft M journaled in the casing and carrying a bevel-gear L² and a worm M', a gear L journaled in the casing and carrying a bevel-gear in mesh with the gear L², a gear N on the pintle J in mesh with the worm M', a dial, and hands carried by the pintle J and the hub of wheel N and registering respectively the yards and inches, substantially as described.

2. In a cloth measuring device, a casing having a revoluble handle at one side and a hollow extension on the opposite side provided with a series of openings in combination with a drive-shaft journaled in said casing and extension and having toothed disks projecting through the openings, a gear carried by the inner end of the drive-shaft, a shaft G carrying at one end a gear in mesh with the gear on the drive-shaft and at the opposite end a worm H, a vertical pintle J, carrying a sleeve, gears K K' carried by the sleeve, said gear K' being in mesh with worm H, a second shaft M journaled in the casing and carrying a bevel-gear L² and a worm M', a gear L journaled in the casing and carrying a bevel-gear in mesh with the gear L², a gear N on the pintle J in mesh with the worm M', a dial, hands carried by the pintle J and the hub of wheel N and registering respectively the yards and inches, a rod P' through which shaft M passes, a spring on the rod for keeping the worm M' in mesh with wheel N, and a wedge passing through the free end of the rod and bearing against the casing and operating when moved in one direction to force the said worm out of engagement with wheel N, and when moved in the opposite direction to allow it to mesh with the said wheel, substantially as described.

In testimony whereof I have signed my name to this specification, in the presence of two subscribing witnesses, on this 19th day of June, 1893.

WILLIAM E. CLARKE.

Witnesses:
E. L. HARLOW,
LILLIAN H. TROW.